United States Patent Office 2,998,450
Patented Aug. 29, 1961

2,998,450
PROCESS OF PREPARING N-ACETYL-p-AMINO PHENOL
Godfrey Wilbert, Carmel, and John De Angelis, Monroe, N.Y., assignors to Warner-Lambert Pharmaceutical Company, Morris Plains, N.J., a corporation of Delaware
No Drawing. Filed May 19, 1958, Ser. No. 735,957
4 Claims. (Cl. 260—562)

This invention relates to the preparation of N-acetyl-p-aminophenol and relates more particularly to a novel process for the direct inexpensive acetylation of electrolytically produced p-aminophenol, whereby excellent yields and an improved quality N-acetyl-p-aminophenol are obtained.

An object of this invention is the provision of a direct process for the production of N-acetyl-p-aminophenol wherein nitrobenzene is electrolytically reduced and the principal product which is obtained, i.e. p-aminophenol, is acetylated directly and without prior isolation from the electrolytic reaction mixture. Another object of this invention is the production of N-acetyl-p-aminophenol in a highly purified form which will conform to the most rigid specifications for this product without costly treatments.

Other objects of this invention will appear from the following detailed description.

The valuable analgesic and antipyretic action of N-acetyl-p-aminophenol is known and extensive therapeutic application of this compound is now being made. Present specifications require an odorless, white product, that is clear and colorless in alcoholic solution and one that with concentrated sulfuric acid gives a water-white reaction to the readily carbonizable substances test.

For a desirably enhanced shelf-life in the case of proprietary preparations which contain N-acetyl-p-aminophenol, it is essential that a compound of sufficient purity to comply with these specifications be prepared. In the preparation of N-acetyl-p-aminophenol, nitrobenzene may be electrolytically reduced while in solution in sulfuric acid or other mineral acid, the mineral acid then neutralized with a suitable alkli such as sodium hydroxide and the crude p-aminophenol then separated. After purification of the crude p-aminophenol by recrystallization, for example, the latter may be converted to the hydrochlorite and this salt is subjected to acetylation while in aqueous solution utilizing sodium acetate and acetic anhydride as the acetylating agent, or may be acetylated with acetic acid and acetic anhydride.

In converting the p-aminophenol in the electrolytic reduction mixture to the acetyl derivative, the initial neutralization of the considerable excess of mineral acid which is usually present, requires the use of equimolecular amounts of sodium hydroxide. In the quantities which are necessary to effect the desired neutralization, the sodium hydroxide employed represents a major factor in the overall production cost. Furthermore, the isolation and purification of the p-aminophenol obtained as the crude reduction product also contributes materially to the cost.

It has now been found that N-acetyl-p-aminophenol may be obtained more efficiently and economically and of a superior quality from the p-aminophenol formed by the electrolytic reduction of nitrobenzene in sulfuric acid, if the sulfuric acid present in the reduction medium is neutralized to a pH of 1.5–4.9 with calcium carbonate, calcium hydroxide or other alkaline earth metal salt or hydroxide to yield an insoluble sulfate, the precipitated sulfate is filtered off, the aqueous filtrate solvent extracted with an organic solvent such as benzene, and the aqueous phase then directly acetylated without intermediate separation and purification of the p-aminophenol present. Not only does this novel method eliminate the costly use of sodium hydroxide as a neutralizing agent, but it also eliminates the necessity for separately forming the hydrochloride salt or acetic acid salt of said p-aminophenol prior to acetylation. Of even greater importance is the fact that this process results in a product of superior quality. In accordance with this process, yields of N-acetyl-p-aminophenol of 80 to 90% based on the p-aminophenol in the processed electrolytic reduction product are readily obtained.

Solvent extraction of the partially neutralized electrolytic reaction mixture appears to remove impurities such as azoxybenzene and azobenzene. Aromatic solvents, such as benzene and toluene, and solvents such as hexane, ligroin and water immiscible aliphatic ethers are effective in removing sufficient impurities to significantly improve the melting point and quality of the N-acetyl-p-aminophenol obtained. Similar runs made without solvent extraction yield a product with a melting point about 5° C. below the required 169° C. and with concentrated sulphuric acid yield a readily carbonizable test that is purple in color instead of the required white to slightly off-white.

In order further to illustrate this invention, but without being limited thereto, the following example is given:

*Example*

Abou 250 ml. of a reaction mixture obtained by the electrolytic reduction of nitrobenzene in sulfuric acid solution and containing about 23 g. of p-aminophenol by assay is neutralized while at a temperature of 60–65° C., to a pH of 4.5 with calcium carbonate. The calcium sulfate precipitate which forms is filtered off, the precipitate washed with hot water at about 65° C. and the filtrate and wash water then combined. The solution is then extracted twice with about 25 ml. portions of benzene and the aqueous phase is treated with about 0.5 part by weight, for each part of p-aminophenol present, of activated carbon and the latter filtered off. The activated carbon is regenerated, by treatment with hot dilute caustic followed by a hot dilute acid wash, and reused a minimum of three times. To the filtrate obtained, there are then added about 0.2 g. of sodium hydrosulfite or sodium sulfite and 15.0 g. of anhydrous sodium acetate in about 27 g. of acetic anhydride at 40° C. The reaction mixture formed is cooled to 8 to 10° C. with stirring and held at this temperature for 60 minutes. A crystalline precipitate of about 27 g. of N-acetyl-p-aminophenol is obtained melting at 169–171° C. This is equivalent to a yield of 85%.

In lieu of utilizing calcium carbonate as the neutralizing agent, calcium hydroxide, barium hydroxide, barium chloride or other alkaline earth metal salt or hydroxide forming an insoluble sulfate may be employed.

It is understood that the foregoing detailed description is given merely by way of illustration and that many variations may be made therein without departing from the spirit of our invention.

Having described our invention, what we desire to secured by Letters Patent is:

1. In a process for the production of N-acetyl-p-aminophenol comprising the steps of electrolytically reducing nitrobenzene in aqueous sulfuric acid solution to form p-aminophenol, neutralizing the sulfuric acid in the reaction mixture and acetylating said p-aminophenol in aqueous solution to form said N-acetyl-p-aminophenol, the improvement which comprises treating the reaction mixture at the conclusion of the electrolytic reduction with an alkaline compound of a metal selected from the group consisting of barium and calcium in an amount sufficient to raise the pH of the mixture to between 1.5 and 4.9 to form an insoluble precipitate of the sulfate of said metal, separating the insoluble precipitate from the mixture, extracting the aqueous mother liquor with a substantially water-insoluble organic solvent selected from the group consisting of benzene, toluene, ligroin, hexane and aliphatic ethers, and separating the organic solvent phase after the extraction to yield an aqueous solution of p-aminophenol in which said p-aminophenol can be acetylated.

2. A method according to claim 1 wherein said alkaline metal compound is calcium carbonate.

3. A method according to claim 1 wherein said organic solvent is benzene.

4. A method according to claim 2 wherein said reaction mixture at the conclusion of the electrolytic reduction is treated with calcium carbonate in an amount sufficient to raise the pH of the mixture to about 4.5.

References Cited in the file of this patent
UNITED STATES PATENTS

| | | |
|---|---|---|
| 1,239,822 | Piquet et al. | Sept. 11, 1917 |

FOREIGN PATENTS

| | | |
|---|---|---|
| 18,081 of 1915 | Great Britain | Dec. 28, 1916 |
| 254,204 | Great Britain | July 1, 1926 |

OTHER REFERENCES

Fieser: Organic Chemistry, 1956, pages 631 and 632.